Patented Feb. 20, 1945

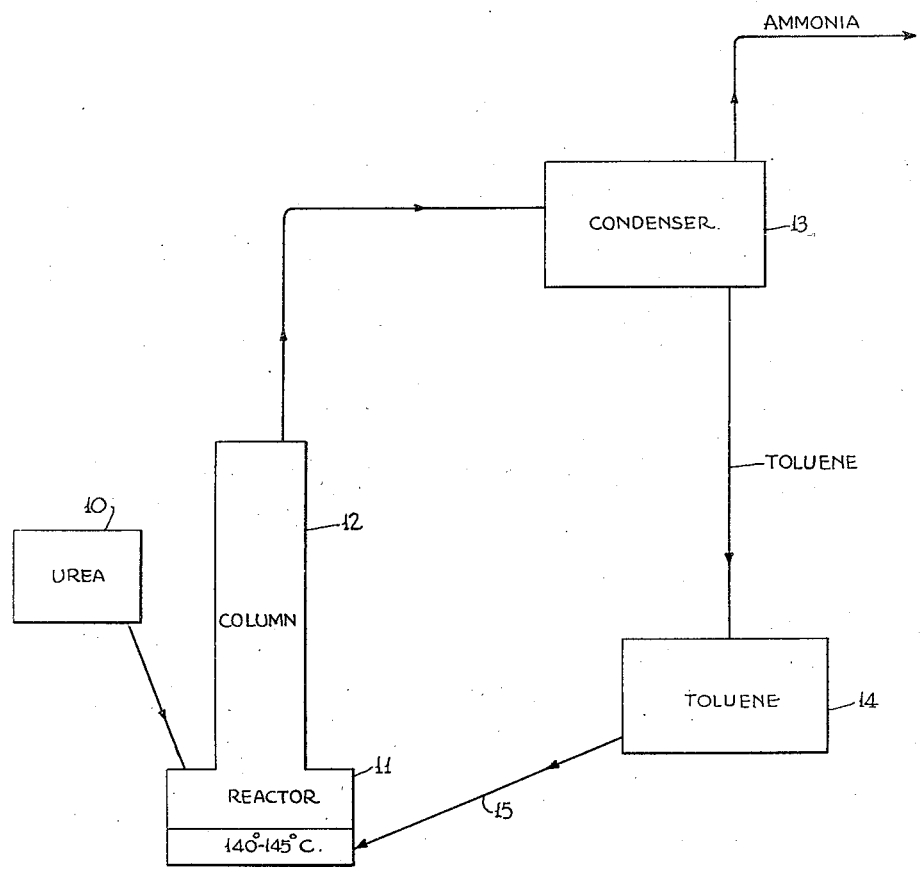

2,370,065

UNITED STATES PATENT OFFICE 2,370,065

MANUFACTURE OF BIURET

John Frank Olin, Grosse Ile, Mich., assignor to Sharples Chemicals Inc., Philadelphia, Pa., a corporation of Delaware Application May 5, 1942, Serial No. 441,779

1 Claim. (Cl. 260—553)

The present invention pertains to the manufacture of biuret, and involves a process of converting urea into biuret by heating the urea to a temperature above its melting point but below the point of decomposition of the biuret formed by the reaction. The nature of the fundamental reaction and the temperautre conditions under which it is accomplished form no part of the present invention, as they are well known in the art, the reaction being ordinarily accomplished at temperatures between 130 and 200° C. and involving condensation of two molecules of urea with each other to form a single molecule of biuret in accordance with the equation

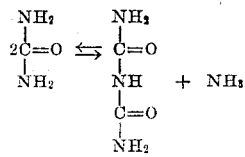

As is well known by those familiar with the reaction of the above equation, the application of the above reaction in such a manner as to favor the yield of the desired biuret can be accomplished best by gradual and mild heating. More rapid and vigorous heating results in substantial conversion to cyanuric acid, ammelide and other undesired by-products. On the other hand, the gradual and mild application of heat to increase the yield has an adverse effect on the conversion of urea to form biuret, by diminishing the rate of reaction. Thus, if the operator desires to increase the rate of conversion he can do so only at the expense of yield, and if he desires to increase the yield he can do so only at the expense of conversion rate. A factor which tends to depress and reverse the desired reaction and thus decrease the conversion rate is the presence in the reactor of ammonia formed in the reaction, and the type of operation favoring high yield (low temperature and gradual heating) involves less rapid removal of ammonia from the zone of reaction.

The above difficulties have been, to a certain extent at least, overcome in the prior art by removal of ammonia during the course of the reaction. Such removal has the disadvantage, however, that valuable reactants or intermediates are to some extent removed with the ammonia, with the result that there is a certain loss of yield from this source, and sometimes also a coating or plugging of the apparatus through which the ammonia is removed, by condensation of this material. This difficulty is especially pronounced when sub-atmospheric pressure is applied to assist in removal of ammonia.

In the practice of the present invention, the above difficulties are avoided by sweeping the ammonia from the reaction chamber, during the course of the reaction, in a current of a gas or vapor of a substance having a boiling point below the reaction temperature at the pressure employed. It is desirable that a substance be employed to assist in this removal which is different from the products of the reaction and inert to them. This sweeping or entraining substance may be introduced into the reaction chamber prior to commencement of the reaction, but it is preferably introduced in liquid or vapor phase during the course of the reaction, as it is possible in this manner to obtain a rapid flow of a stream of the sweeping or entraining gas through the reaction chamber, with the result that the ammonia formed by the reaction is rapidly removed and that precipitation of other reactants which may be removed is minimized.

It is desirable that the gas chosen to accomplish the sweeping function be the vapor of a substance which can be separated from the entrained ammonia with facility, and it is also desirable that it be capable of retaining vapors of reactants other than ammonia which may be separated with the ammonia from the reaction vessel, when the ammonia is separated. In case a gas having these characteristics is chosen, any valuable materials removed from the reactor with the gas along with the ammonia will be returned with the gas to the reactor when the gas is recycled, after separation of ammonia. It has been found that the best substances for accomplishing these results are vapors of hydrocarbons, toluene and naphtha being especially well suited to this purpose.

The attached flow sheet illustrates practice of the process by use of the vapor of toluene as the entraining gas.

As illustrated in the flow sheet, urea from container 10 is charged to reactor 11, which is mounted at the base of column 12. The urea is heated to a temperature above its melting point (e. g., between 140 and 145° C.) and the molten mass is stirred during addition of toluene from container 14 under the surface of the molten urea. Upon being passed to the reactor, the toluene is vaporized, and it entrains ammonia and carries the ammonia through column 12 to condenser 13. The toluene, together with any other removed reactants of higher boiling point than ammonia which may be entrained therein, is condensed in condenser 13, the ammonia being removed from this condenser in vapor phase. Toluene condensed in condenser 13 is returned to container 14, from which it may again be passed to reactor 11, together with any other material which may have been removed from the reactor, during the continued progress of the reaction. By proper control of the rate of flow of toluene through the conduit 15 interconnecting container 14 with reactor 11, this stream may be retained at such volume as to provide rapid removal of ammonia through the column 12, without providing such a large stream of toluene vapors as to flood this column. The use of toluene vapors for performance of the function of entraining ammonia is particularly beneficial because of the fact that it minimizes condensation of materials which may be removed from the reactor 11 in the stream of toluene on the surfaces of the column 12, condenser 13 and associated conduits.

The following examples illustrate the practice of the invention.

Example I

The reaction vessel 11 was charged with 1200 grams of urea and container 14 was charged with 725 grams of toluene. The urea was melted and heated to a temperature between 175 and 185° C., and stirred at this temperature during continuous introduction of a stream of toluene below the surface of the molten urea. At the end of two hours, the molten material was extracted with water at a temperature between 5 and 10° C., and the biuret filtered from extracted material and dried in an oven at 105° C. The filtrate was evaporated to recover urea. The conversion to biuret obtained in this operation was 31.2%, and a yield of 56.1% was obtained.

Example II

The reaction vessel 11 was charged with 1200 grams of urea and container 14 was charged with 781 grams of toluene. The molten urea was held at a temperature between 150 and 155° C. and stirred during continuous introduction of a stream of toluene for four hours as in Example I. In this experiment a conversion of the urea to biuret of 37.9% and a yield of 67.2% was obtained.

Example III

The reaction was conducted as in Example II, except that the temperature was maintained between 140 and 145° C. In this example, a conversion of 36.9% and a yield of 91.5% were obtained, with a much purer product than was obtained in the practice of Examples I and II.

Various modifications are possible within the scope of the invention, and I do not therefore wish to be limited except by the scope of the following claim.

I claim:

In the manufacture of biuret, the process comprising, heating urea to a temperature above its melting point but below the decomposition temperature of the biuret, sweeping ammonia formed by condensation of urea to form biuret from the zone of reaction in a stream of a hydrocarbon gas, separating ammonia swept from the reaction zone from the hydrocarbon used as a sweeping gas, and thereafter returning said hydrocarbon to the reaction zone to effect removal of further quantities of ammonia from the reaction zone during reaction to form a further quantity of biuret.

JOHN FRANK OLIN.